United States Patent
Gannon et al.

(10) Patent No.: US 9,014,879 B2
(45) Date of Patent: Apr. 21, 2015

(54) MESSAGING AND DATA ENTRY VALIDATION SYSTEM AND METHOD FOR AIRCRAFT

(71) Applicant: Honeywell International Inc., Morristown, NJ (US)

(72) Inventors: Aaron Gannon, Anthem, AZ (US); Ivan Sandy Wyatt, Scottsdale, AZ (US); Jary Engels, Peoria, AZ (US); Steven P. Grothe, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/028,691

(22) Filed: Sep. 17, 2013

(65) Prior Publication Data
US 2015/0081137 A1    Mar. 19, 2015

(51) Int. Cl.
G01C 23/00 (2006.01)
G05D 1/00 (2006.01)
G05D 3/00 (2006.01)
G06F 7/00 (2006.01)
G06F 17/00 (2006.01)
B64D 45/00 (2006.01)

(52) U.S. Cl.
CPC ..................... B64D 45/00 (2013.01)

(58) Field of Classification Search
CPC ....................................................... B64D 45/00
USPC ............................................................. 701/3
See application file for complete search history.

(56) References Cited

U.S. PATENT DOCUMENTS

| | | | | |
|---|---|---|---|---|
| 2,411,595 A | * | 11/1946 | Sanders, Jr. | 324/76.49 |
| 2,426,901 A | * | 9/1947 | Sanders, Jr. | 342/128 |
| 3,249,785 A | * | 5/1966 | Floyd et al. | 313/376 |
| 3,513,749 A | * | 5/1970 | Magnant | 89/1.807 |
| 3,670,656 A | * | 6/1972 | Donahue et al. | 102/228 |
| 7,605,802 B2 | | 10/2009 | Hartkopp | |
| 7,809,405 B1 | | 10/2010 | Rand et al. | |
| 7,912,592 B2 | | 3/2011 | Komer et al. | |

(Continued)

FOREIGN PATENT DOCUMENTS

EP    2199894 A1    6/2010

OTHER PUBLICATIONS

Nikolic, M.I. et al.; Multisensory Feedback in Support of Pilot-Automation Coordination: The Case of Uncommanded Mode Transitions; SAGE journals, Proceedings of the Human Factors and Ergonomics Society Annual Meeting Oct. 1998 vol. 42 No. 3 239-243. [Retrieved from Internet Jun. 20, 2013.] [www.pro.sagepub.com/content/42/31239.short].

(Continued)

Primary Examiner — Mary Cheung
Assistant Examiner — Frederick Brushaber
(74) Attorney, Agent, or Firm — Ingrassia Fisher & Lorenz, P.C.

(57) ABSTRACT

A system and method for validating data entry in response to an instruction received in an aircraft cockpit includes receiving, in an aircraft cockpit, an instruction that requires an aircraft pilot to manually enter a target value into an avionics system using an avionics system user interface. The received instruction is processed to determine the target value that should be set by the aircraft pilot using the avionics system user interface. Haptic feedback is to the avionics system user interface during the manual entry by the aircraft pilot.

20 Claims, 2 Drawing Sheets

(56) References Cited

U.S. PATENT DOCUMENTS

| | | |
|---|---|---|
| 8,330,732 B2 * | 12/2012 | Nutaro et al. ................ 345/173 |
| 2008/0045198 A1 | 2/2008 | Bhogal et al. |
| 2010/0027768 A1 | 2/2010 | Foskett |
| 2011/0282522 A1 | 11/2011 | Prus et al. |
| 2012/0022774 A1 | 1/2012 | Pinheiro et al. |

OTHER PUBLICATIONS

EP Search Report for Application No. 14182557.0 dated Jan. 30, 2015.

* cited by examiner

MESSAGING AND DATA ENTRY VALIDATION SYSTEM AND METHOD FOR AIRCRAFT

TECHNICAL FIELD

The present invention generally relates to validation of messaging and associated data entry, and more particularly relates to a system and method for validating messaging and data entry in an aircraft.

BACKGROUND

Communications to and from an aircraft may involve speech, text, or both. For example, communications between an aircraft and ground control (e.g., air traffic control) may be radio-transmitted verbal communications or radio-transmitted data link (e.g., textual) communications. In many instances, especially when the communication is verbal, the communication may include an instruction that requires a vocal response from an aircraft pilot. The communication, whether verbal or textual, may also require the aircraft pilot to manually enter a setting using a avionics system user interface.

One example of a communication that requires both a vocal response and a manual entry is a clearance message from air traffic control. For example, air traffic control may transmit the verbal clearance message, "Turn left, heading 2-5-0," to a particular aircraft. Upon receipt of the message, the aircraft pilot is relied upon to do perform several tasks. These tasks may include: correctly hearing and interpreting the message; verbally transmitting the message back to air traffic control (e.g., "Turn left, heading 2-5-0); applying visual attention to manually setting the new heading; and correctly setting the new heading. Depending upon the current flight state of the aircraft, these tasks may increase overall pilot workload, which can increase the likelihood of pilot error.

Hence, there is a need for a system and method for validating messaging and data entry in an aircraft, and thereby reducing the likelihood of pilot error. The present invention addresses at least this need.

BRIEF SUMMARY

In one embodiment, a method of validating data entry in response to an instruction received in an aircraft cockpit includes receiving, in an aircraft cockpit, an instruction that requires an aircraft pilot to manually enter a target value into an avionics system using an avionics system user interface. The received instruction is processed to determine the target value that should be set by the aircraft pilot using the avionics system user interface. Haptic feedback is to the avionics system user interface during the manual entry by the aircraft pilot.

In another embodiment, a system for validating data entry in response to an instruction received in an aircraft cockpit includes an avionics system user interface, a receiver, and a processor. The avionics system user interface is coupled to receive haptic feedback signals and is configured, upon receipt thereof, to generate haptic feedback. The receiver is adapted to receive an instruction that requires an aircraft pilot to manually enter a target value into an avionics system using the avionics system user interface. The processor is coupled to receive at least data representative of the instruction and is configured to determine the target value that should be set by the aircraft pilot using the avionics system user interface, and supply the haptic feedback signals to the avionics system user interface during the manual entry by the aircraft pilot.

In yet another embodiment, a system for validating data entry in response to an instruction received in an aircraft cockpit includes an avionics system user interface, a receiver, a microphone, and a processor. The receiver is adapted to receive an instruction that requires a vocal response from an aircraft pilot and a manual entry, by the aircraft pilot, of a setting using the avionics system user interface. The microphone is adapted to receive the vocal response from the aircraft pilot and is configured, upon receipt thereof, to supply voice data representative of the vocal response supplied by the aircraft pilot. The processor is coupled to receive the voice data and is configured, upon receipt thereof, to verify that the vocal response is consistent with the received instruction, process the received instruction and the vocal response to determine if there are any inconsistencies therebetween, generate an alert when a determination is made that there are inconsistencies, and supply haptic feedback to the avionics system user interface during the manual entry by the aircraft pilot.

Furthermore, other desirable features and characteristics of the messaging and data entry validation system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
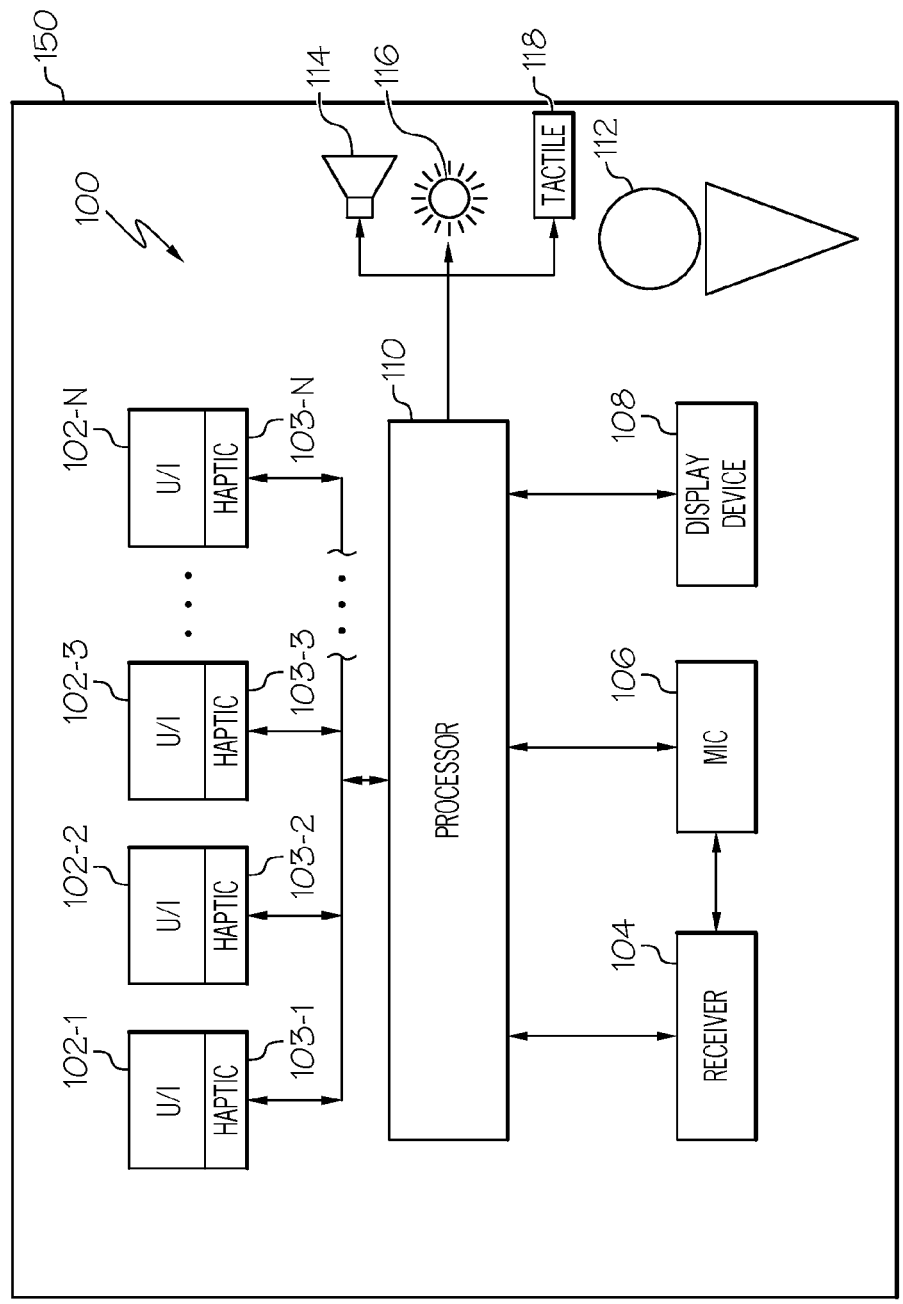
FIG. 1 depicts a simplified functional block diagram of a portion of one embodiment of an aircraft avionics system.

Referring to FIG. 1, a simplified functional block diagram of a portion of one embodiment of an aircraft avionics system 100 is depicted. In the depicted embodiment, the system 100 includes one or more an avionics system user interfaces 102 (e.g., 102-1, 102-2, 102-3 . . . , 102-N), a receiver 104, a microphone 106, a display device 108, and one or more processors 110 (only one depicted), all or portions of which are disposed in an aircraft cockpit 150. Each of the user interfaces 102 is configured to receive manual input from a user 112 (e.g., an aircraft pilot) and supply to user interface data to the processor 110. The user interfaces 102 may vary in configuration and implementation. For example, one or more of the user interfaces may be touchscreen user interfaces, rotational knobs, push-buttons, joysticks, and trackballs, just to name a few non-limiting examples.

Regardless of how each user interface 102 is specifically implemented, the user interface data that each user interface 102 is configured to supply is representative of a parameter that the specific user interface is used to manipulate and set. For example, one of the user interfaces 102 may be a heading bug, which is used to manipulate and set the aircraft heading. Each user interface 102 is additionally coupled to receive haptic feedback signals and is configured, upon receipt of these signals, to generate haptic feedback. To do so, each user interface 102 preferably includes a haptic feedback generator 103 (e.g., 103-1, 103-2, 103-3, . . . 103-N). Each haptic feedback generator 103 is responsive to the haptic feedback signals it receives to generate haptic feedback. The haptic feedback generators 103 may vary in configuration and implementation, and may include, for example, a device that vibrates the user interface 102, a device that implements a plurality of detents, or a device that implements a resistive force, just to name a few non-limiting examples.

The receiver 104 is adapted to receive various radio and/or data communications from, for example, a ground station, such as air traffic control. The radio communications may be in the form of verbal communications, and the data communications may be in the form of textual communications (e.g., data link communications). The radio and data communications that are received may vary. In some cases, the communications will include instructions that require a vocal response from the aircraft pilot, while in other cases the communications will not. The instructions may also, in many instances, require the aircraft pilot to manually enter a target value using one of the avionics system user interfaces 102. The receiver 104, in addition to receiving the radio and data communications, supplies communication data representative of the received communications, including the target value to the processor 110.

The microphone 106 is in operable communication with the processor 110 and is adapted to receive vocal input from the aircraft pilot 112. Thus, the microphone 106 is adapted to receive the vocal responses from the aircraft pilot 112 that may be required in response to some of the instructions that are received by the receiver 104. The microphone 106, which may be implemented using any one of numerous known microphone devices, is configured, upon receipt of vocal input from the aircraft pilot 112, to supply voice data to the processor 110. It will be appreciated that the voice data may be supplied via the receiver 104, and that the receiver 104 may be implemented as a transceiver that also transmits the vocal response back to the ground station.

The display device 108 is in operable communication with, and is coupled to receive image rendering display commands from, the processor 110. The display device is configured, upon receipt of the image rendering display commands, to render one or more images, and thereby supply visual feedback to the aircraft pilot 112. The rendered images may include various types of textual, graphic, and/or iconic information, some of which will be described further below. It will be appreciated that the display device 108 may be implemented using any one of numerous known display screens suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display device 108 may additionally be implemented as a panel mounted display, a HUD (head-up display) projection, or any one of numerous known technologies. It is additionally noted that the display device 108 may be configured as any one of numerous types of aircraft flight deck displays. For example, it may be configured as a multi-function display, a horizontal situation indicator, or a vertical situation indicator. In the depicted embodiment, however, the display device 108 is configured as a primary flight display (PFD). In some embodiments, display device 108 may include multiple display screens and the system 100 may include multiple display device 108.

The processor 110 is in operable communication with the user interfaces 102, and more specifically, with each of the haptic feedback generators 103. The processor 110 is also in operable communication with the receiver 104, the microphone 106, and the display device 108. It will be appreciated that the processor 110 may be implemented using any one of numerous types of computers, computer systems, microprocessors, collection of logic devices, or any other analog or digital circuitry that is configured to calculate, and/or to perform algorithms, and/or to execute software applications, and/or to execute sub-routines, and/or to be loaded with and to execute any type of computer program. The processor 110 may comprise a single processor or a plurality of processors acting in concert. In some embodiments, the processor 110 may be dedicated for use exclusively with the system 100, while in other embodiments it may be shared with other systems on board the aircraft. In still other embodiments, the processor 110 may be integrated into one or more of the other components of the system 100.

No matter how the processor 110 is specifically implemented, it is coupled to receive the communications data supplied by the receiver 104. Moreover, when a vocal response to a received instruction is required, the processor 110 is also coupled to receive voice data supplied by the microphone 106. The processor 110 is configured, upon receipt of these data, to determine the target value that should be set by the aircraft pilot using the avionics system user interface 102. If the instruction requires a vocal response from the aircraft pilot, the processor 110 is additionally configured to verify that the vocal response is consistent with the received instruction. To implement this latter functionality, as may be appreciated, the processor 110 is configured to implement any one of numerous known voice recognition software routines. The processor 110 is additionally configured to supply the haptic feedback signals to the appropriate user interface(s) 102, and more specifically the appropriate haptic feedback generator(s) 103, at least while the aircraft pilot 112 is manipulating the user interface 102 to manually enter a setting.

It will be appreciated that in some embodiments, the processor 110 may be configured to supply variable haptic feedback signals to the avionics system user interface(s) 102. In these embodiments, the haptic feedback generated by the haptic feedback generator(s) 103 varies in magnitude as the aircraft pilot manually manipulates the avionics system user interface(s) 102. Preferably, the haptic feedback increases in magnitude based on the proximity to a target value of the setting that the avionics system user interface 102 is being used to set. For example, assume that the aircraft heading is the setting that is being manipulated, and that the target value is "250." As the aircraft pilot manually enters the new heading using the appropriate user interface 102, the haptic feedback generated by the haptic feedback generator 103 associated with this user interface 102 will increase the closer the setting gets to the target value of "250." As may be appreciated, to facilitate this functionality, the processor 110 may be further configured to process the received instruction to determine the target value that should be set by the aircraft pilot using the avionics system user interface(s) 102.

In addition to the above, the processor 110 may also be configured, at least in some embodiments, to supply image rendering display commands to the display device 108. As noted above, the display device 108 is configured, in response to received image rendering display commands, to display various types of information. In the depicted embodiment, the image rendering display commands the processor 110 supplies causes the display device 108 to render at least the instruction that was received by the receiver 104. The processor 110 may also, when necessary, supply image rendering display commands that cause the display device 108 to render the vocal response that was processed. This latter functionality provides a readily available visual cue to the aircraft pilot 112 as to whether he/she correctly interpreted the received instruction.

As another means for determining whether the aircraft pilot correctly interpreted the received instruction, the processor 110 may also be configured to compare the received instruction and the confirming vocal response to determine if there are any inconsistencies between the two. Preferably, in such embodiments, the processor is further configured to generate an alert when it determines that there are indeed inconsistencies. The alert that is generated may vary, and may include an aural alert, a visual alert, a tactile alert, or various combinations thereof, just to name a few. Thus, as FIG. 1 further depicts, the system 100 may additionally include various alert generators, including but not limited to one or more sound emitters 114, one or more visual alert emitters (e.g., lights) 116, and/or one or more tactile alert generators 118. It will be appreciated that the alert generators may be integrated with one or more of the previously described components of the system 100.

In some embodiments, the processor 100 is may also be configured to compare the processed confirming vocal response to the setting that the aircraft pilot 112 manually entered. If, based on this comparison, the processor 110 determines that there are inconsistencies between the processed confirming vocal response and the manually entered setting, the processor 100 generates an alert. Again, the alert that is generated may vary, and may include an aural alert, a visual alert, a tactile alert, or various combinations thereof, just to name a few.

Figure 2:
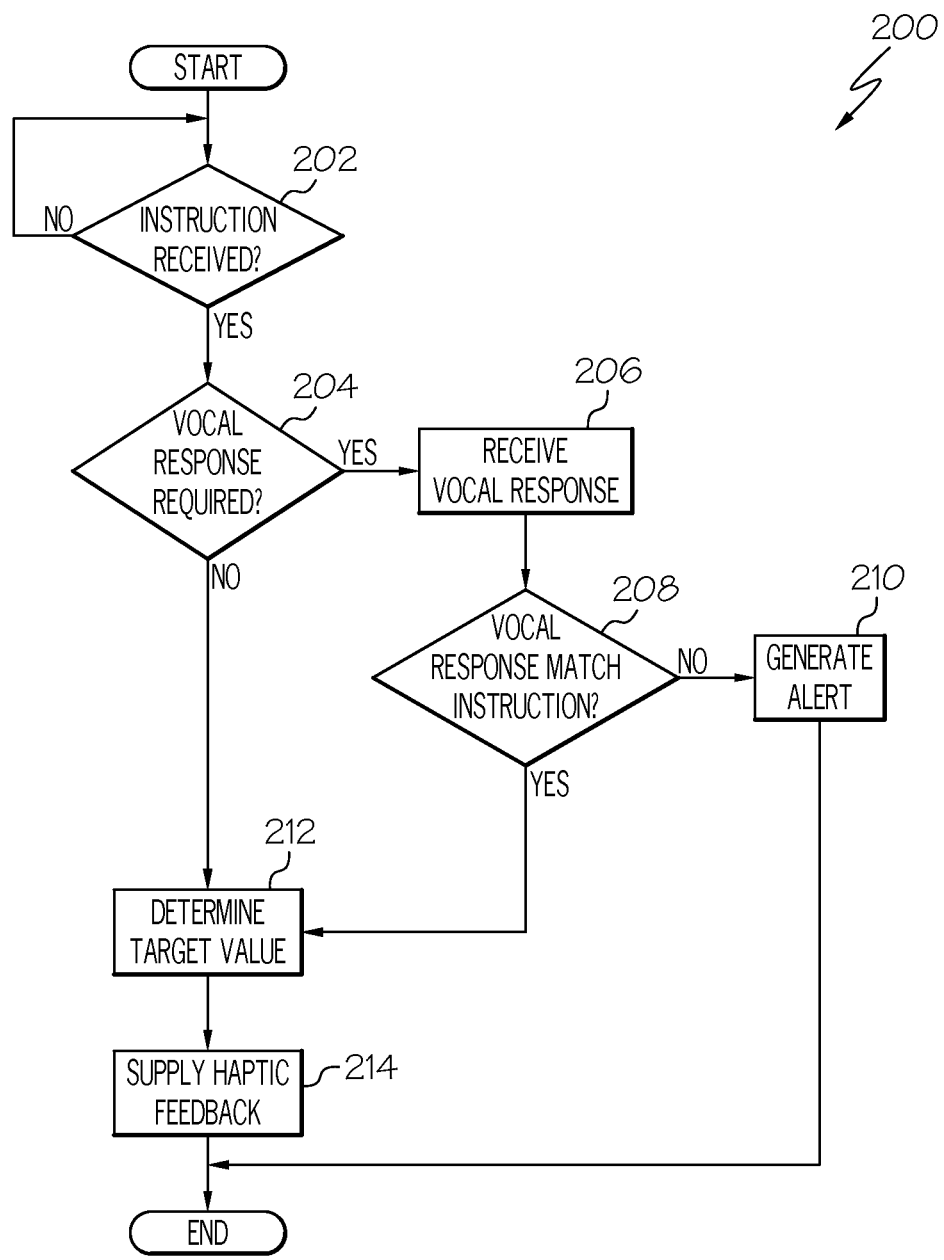
FIG. 2 depicts a process, in flowchart form, that may be implemented in the system of FIG. 1 to validate both a received message and data entry associated therewith.

The process of validating messaging and data entry in response to an instruction received in an aircraft cockpit 150 was generally described above. Referring to FIG. 2, this process 200 is depicted in flowchart form, and will now be described. In doing so, it should be noted that the parenthetic reference numerals in the following description refer to like-numbered flowchart symbols in FIG. 2.

The process 200 begins upon receipt, in the aircraft cockpit 150, of an instruction that requires at least manual entry, by the aircraft pilot 112, of a target value into an avionics system using an avionics system user interface 102 (202). The processor 110 processes the received instruction to determine if the instruction is one that requires a vocal response (204). If the instruction does require a vocal response, then the processor 110 then receives, via the microphone 106, the vocal response from the aircraft pilot 112 (206). The received vocal response is then processed to verify that the vocal response is consistent with the received instruction (208). If not, an alert is generated (210). If the vocal response is consistent with the received instruction, or if it was previously determined that a vocal response is not required, the processor 110 further processes the received instruction to determine the target value that should be set by the aircraft pilot using the avionics system user interface (212). Thereafter, haptic feedback is supplied to the avionics system user interface 102 during the manual entry by the aircraft pilot (214).

The system and method described herein provide for the validation of messaging and data entry in an aircraft. As a result, the likelihood of pilot error in response to such messaging is reduced.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of validating data entry in response to an instruction received in an aircraft cockpit, the method comprising:
   receiving, in an aircraft cockpit, an instruction that requires an aircraft pilot to manually enter a target value into an avionics system using an avionics system user interface;
   processing the received instruction to determine the target value that should be set by the aircraft pilot using the avionics system user interface; and
   supplying haptic feedback to the avionics system user interface during the manual entry by the aircraft pilot.

2. The method of claim 1, wherein the step of supplying haptic feedback comprises supplying variable haptic feedback to the avionics system user interface during the manual entry by the aircraft pilot.

3. The method of claim 1, further comprising:
   varying the haptic feedback supplied to the avionics system user interface based on proximity, to the target value, of the setting that is being manually entered.

4. The method of claim 1, wherein the instruction further requires a vocal response from the aircraft pilot and the method further comprises:
   receiving the vocal response from the aircraft pilot; and
   processing the received vocal response to verify that the vocal response is consistent with the received instruction.

5. The method of claim 4, further comprising:
   displaying the received instruction on a display device; and
   displaying the processed vocal response on the display device.

6. The method of claim 4, further comprising:
   processing the received instruction and the vocal response to determine if there are any inconsistencies therebetween.

7. The method of claim 6, further comprising:
   generating an alert when a determination is made that there are inconsistencies.

8. The method of claim 1, further comprising:
   receiving a confirming vocal response representative of the setting that was manually entered by the aircraft pilot using an avionics system user interface.

9. The method of claim 7, further comprising:
   processing the confirming vocal response and comparing the processed confirming vocal response to the setting that was manually entered to determine if there are any inconsistencies therebetween.

10. The method of claim 8, further comprising:
    generating an alert when a determination is made that there are inconsistencies.

11. A system for validating data entry in response to an instruction received in an aircraft cockpit, the method comprising:
    an avionics system user interface coupled to receive haptic feedback signals and configured, upon receipt thereof, to generate haptic feedback;
    a receiver adapted to receive an instruction that requires an aircraft pilot to manually enter a target value into an avionics system using the avionics system user interface;
    a processor coupled to receive at least data representative of the instruction and configured to (i) determine the target value that should be set by the aircraft pilot using the avionics system user interface and (ii) supply the haptic feedback signals to the avionics system user interface during the manual entry by the aircraft pilot.

12. The system of claim 11, wherein the processor is further configured to supply variable haptic feedback to the avionics system user interface during the manual entry by the aircraft pilot.

13. The system of claim 11, wherein the processor is further configured to vary the haptic feedback supplied to the avionics system user interface based on proximity, to the target value of the setting that is being manually entered.

14. The system of claim 11, wherein:
    the instruction further requires a vocal response from the aircraft pilot;
    the processor is further coupled to receive voice data representative of the vocal response; and
    the processor is further configured to verify that the vocal response is consistent with the received instruction.

15. The system of claim 14, further comprising:
    a microphone in operable communication with the processor, the microphone adapted to receive the vocal response from the aircraft pilot and configured, upon receipt thereof, to supply the voice data to the processor.

16. The system of claim 14, further comprising:
    a display device in operable communication with the processor and coupled to receive image rendering display commands, the display device configured, upon receipt of the image rendering display commands, to render one or more images,
    wherein the processor is further configured to supply image rendering display commands to the display device that cause the display device to render (i) the received instruction and (ii) the processed vocal response.

17. The system of claim 14, wherein the processor is further configured to:
process the received instruction and the vocal response to determine if there are any inconsistencies therebetween; and
generate an alert when a determination is made that there are inconsistencies.

18. The system of claim 11, wherein the processor is further configured to:
receive and process voice data representative of a confirming vocal response, the confirming vocal response representative of the setting that was manually entered by the aircraft pilot using an avionics system user interface; and
compare the processed confirming vocal response to the setting that was manually entered to determine if there are any inconsistencies therebetween.

19. The system of claim 18, wherein the processor is further configured to generate an alert when a determination is made that there are inconsistencies.

20. A system for validating data entry in response to an instruction received in an aircraft cockpit, the method comprising:
an avionics system user interface;
a receiver adapted to receive an instruction that requires a vocal response from an aircraft pilot and a manual entry, by the aircraft pilot, of a setting using the avionics system user interface;
a microphone adapted to receive the vocal response from the aircraft pilot and configured, upon receipt thereof, to supply voice data representative of the vocal response supplied by the aircraft pilot; and
a processor coupled to receive the voice data and configured, upon receipt thereof, to:
verify that the vocal response is consistent with the received instruction,
process the received instruction and the vocal response to determine if there are any inconsistencies therebetween,
generate an alert when a determination is made that there are inconsistencies, and
supply haptic feedback to the avionics system user interface during the manual entry by the aircraft pilot.

* * * * *